United States Patent [19]

Sawada et al.

[11] Patent Number: 4,776,975
[45] Date of Patent: Oct. 11, 1988

[54] NEMATIC LIQUID CRYSTAL COMPOSITION

[75] Inventors: Shinichi Sawada; Hideo Saito, both of Yokohama; Kenji Furukawa, Yokosuka, all of Japan

[73] Assignee: Chisso Corporation, Japan

[21] Appl. No.: 3,760

[22] Filed: Jan. 16, 1987

[30] Foreign Application Priority Data

Jan. 20, 1986 [JP] Japan .................................. 61-9360

[51] Int. Cl.$^4$ .......................... G02F 1/13; C09K 19/34
[52] U.S. Cl. ............................ 252/299.61; 252/299.5; 252/299.63; 350/350 R
[58] Field of Search ........... 252/299.5, 299.61, 299.63; 350/350 R

[56] References Cited

U.S. PATENT DOCUMENTS

| | | | |
|---|---|---|---|
| 4,536,321 | 8/1985 | Sugimori et al. | 252/299.63 |
| 4,581,155 | 4/1986 | Goto et al. | 252/299.61 |
| 4,623,477 | 11/1986 | Ogawa et al. | 252/299.61 |
| 4,640,795 | 2/1987 | Ogawa et al. | 252/299.61 |
| 4,664,840 | 5/1987 | Osman | 252/299.63 |

FOREIGN PATENT DOCUMENTS

| | | | |
|---|---|---|---|
| 3315295 | 10/1984 | Fed. Rep. of Germany | 252/299.61 |
| 59-199786 | 11/1984 | Japan | 252/299.61 |
| 59-216876 | 12/1984 | Japan | 252/299.61 |
| 60-54371 | 3/1985 | Japan | 252/299.61 |
| 60-199879 | 10/1985 | Japan | 252/299.61 |

OTHER PUBLICATIONS

Osman, M. A., et al., Mol. Cryst. Liq. Cryst., vol. 82 (Letters), pp. 331–338 (1983).

*Primary Examiner*—Teddy S. Gron
*Attorney, Agent, or Firm*—Leydig, Voit & Mayer

[57] ABSTRACT

A nematic liquid crystal composition capable of improving reduction in the threshold voltage of TN type liquid crystal display elements and the temperature dependency thereof, and a liquid crystal display element using the composition are provided, which composition comprising 10 to 80% by weight of a first component comprising at least one compound expressed by the formula

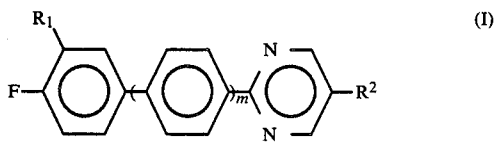

(I)

wherein m represents 0 or 1, $R^1$ represents F or H and $R^2$ represents an alkyl group of 1 to 8 carbon atoms, and 10 to 40% by weight of a second component comprising at least one compound expressed by the formula

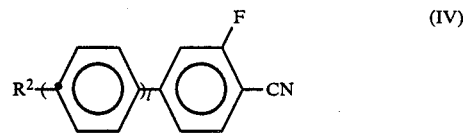

(IV)

wherein l represents 1 or 2 and $R^2$ is as defined above.

19 Claims, No Drawings

NEMATIC LIQUID CRYSTAL COMPOSITION

BACKGROUND OF THE INVENTION

1. Field of the Invention

This invention relates to a liquid crystal composition and a TN type liquid crystal display element using the same. More particularly it relates to a liquid crystal composition capable of improving reduction in the threshold voltage (hereinafter abbreviated often to Vth) of TN type liquid crystal display elements and the temperature dependency thereof.

2. Description of the Prior Art

In recent years, the performance of liquid crystal display devices have been improved and their fields of application have come to be further extended. Initially liquid crystal display devices were used mainly for handy type electric calculators, watches, clocks, etc., making use of their specific feature of low electrical power consumption. However, with development of liquid crystal compositions, the fields of application have recently come to be rapidly extended to those of large type display devices such as outdoor display devices, instrument panels for automobiles, display devices for hand-held computors or terminal equipments of computors, etc.

When this is viewed from the point of the drive mode of display devices, the 3 V drive static mode at the initial period is being transferred, for enlargement of the information content, reduction in the number of parts, etc., toward a high performance display mode having e.g. the following number of multiplex drive at a definite drive voltage:

½ duty at 3 V drive in the case of watches, clocks, etc., ⅛–¼ duty at 3 V drive in the case of electric calculators, and 1/16 duty at 4.5 V drive and 1/64 duty or more at ten and several V in the case of word processors, computer terminal, etc. Further, in addition to such a development, requirement for low voltage drive which is another specific feature of liquid crystal display devices has been intensifying in order to make LCD smaller in size and lighter in weight. For example, there have been desired ½–¼ duty at 1.5 V drive in the case of waters, clocks, electric calculators, etc., 1/16 duty at 3 V drive in the case of word processors, etc., and 1/64 duty at 10 V or lower voltage drive. It has been desired to reduce the threshold voltage with respect of the voltage-brightness characteristic of liquid crystal compositions, but in the case of conventional material systems, it has been very difficult to effect a low voltage drive while other characteristics such as ensuring the display grade, mentioned later, the temperature dependency of the threshold voltage and the viscosity relative to the response time are satisfied.

Usually, in the case of the multiplex drive mode employing the voltage-leveling method, there is existent in principle, an operational limitation which does not occur at all in the case of the static mode. The operational limitation arises from the occurrence of a crosstalk at half-selected or unselected elements. The crosstalk is more liable to occur in a higher multiplexed matrix addressing scheme where the operation margin i.e. the allowance of the operation voltage is reduced.

There are the following three factors on which the operational margin depends:

(1) the temperature dependency of threshold voltage,
(2) the view angle dependency of threshold voltage, and
(3) the steepness of threshold voltage.

As to the factor (2) among these, the cell preparation conditions, such as the thickness of the display cell, have a great influence, and the difference between the material systems has a small influence. As to the factor (3), this is specific of TN type liquid crystal display devices and there occurs no notable difference which depends on the material systems. Whereas, as to the factor (1), the influence of the material systems is greatest among the factors in the aspect of its relation to the operation temperature range. In order to improve the factor (1), it has generally been carried out as a countermeasure directed to liquid crystal compositions to reduce the temperature dependency of the threshold voltage by increasing the proportion of a material having a negative dielectric anisotropy (hereinafter abbreviated often to $\Delta\epsilon$). However, an increase in the proportion of a material having a negative dielectric anisotropy ($\Delta\epsilon$) results in elevation of the threshold voltage so that it has been impossible to achieve a sufficiently low voltage drive.

Further, for the display devices, the response time is a non-negligible, important property. It has been well known that the response speed of liquid crystal display devices has a relationship to the viscosity of liqurid crystal compositions relative thereto. When only conventional materials are used for achieving reduction in the threshold voltage, the resulting liquid crystal compositions have a high viscosity; hence it has been very difficult to achieve a satisfactory response time for the display devices.

SUMMARY OF THE INVENTION

As apparent from the foregoing, the object of the present invention is to provide a novel liquid crystal maerial by the use of which the temperature dependency of the threshold voltage is reduced and also a sufficiently low threshold voltage can be achieved while various characteristics required for liquid crystal display devices such as operation temperature range, response speed, etc. are kept in a well balanced manner.

The present invention in a first aspect resides in (1) a nematic liquid crystal composition comprising 10 to 80% by weight of a first component comprising at least one compound expressed by the formula

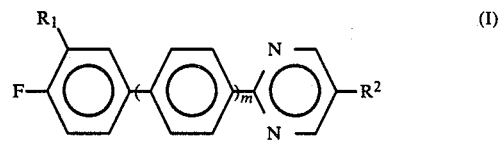

wherein m represents 0 or 1, $R^1$ represents F or H and $R^2$ represents an alkyl group of 1 to 8 carbon atoms, and 10 to 40% by weight of a second component comprising at least one compound expressed by the formula

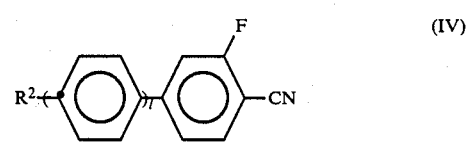

wherein l represents 1 or 2 and $R^2$ is as defined above.

The present invention as an embodiment of the item (1) resides in
(2) a nematic liquid crystal composition according to the item (1) wherein the first component expressed by the formula (I) comprises 0 to 40% by weight of a compound expressed by the formula (II)

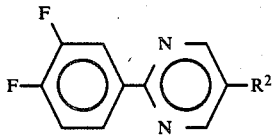
(II)

and 10 to 40% by weight of a compound expressed by the formula (III)

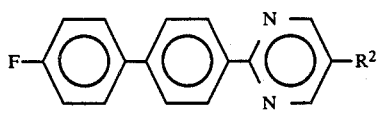
(III)

said $R^2$ in the formulas (II) and (III) being as defined in item (1).

The present invention in a second aspect resides in
(3) a nematic liquid crystal composition comprising a first component comprising 0 to 40% by weight of at least one compound expressed by the formula (II), and 10 to 40% by weight of at least one compound expressed by the formula (III) and 10 to 40% by weight of a second component comprising at least one compound expressed by the formula (IV), each mentioned below, and further as third et seq. components, 0 to 32% by weight of at least one compound expressed by the formula (V), 0 to 20% by weight of at least one compound expressed by the formula (VI), 0 to 18% by weight of at least one compound expressed by the formula (VII), 0 to 40% by weight of at least one compound expressed by the formula (VIII) and 0 to 40% by weight of at least one compound expressed by the formula (IX), each mentioned below,

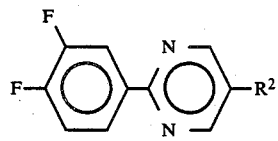
(II)

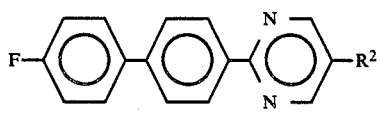
(III)

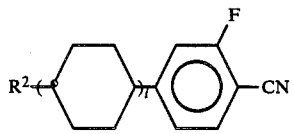
(IV)

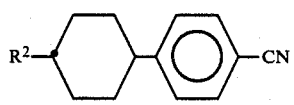
(V)

(VI)

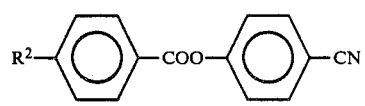
(VII)

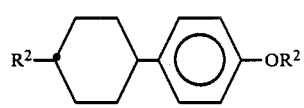
(VIII)

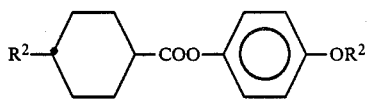
(IX)

wherein l in the formula (IV) represents 1 or 2 and $R^2$s in the formulas (II)–(IX) each independently represent an alkyl group of 1 to 8 carbon atoms.

The present invention in a third aspect resides in a liquid crystal display element characterized by using a liquid crystal composition according to any one of the above items (1)–(3).

DESCRIPTION OF PREFERRED EMBODIMENTS

Examples of compounds used as the first component in the liquid crystal composition of the present invention are 2-(3,4-difluorophenyl)-5-alkylpyrimidines, 2-(4-fluorophenyl)-5-alkylpyrimidines, 2-(3,4-difluorobiphenylyl-4')-5-alkylpyrimidines, 2-(4-fluorobiphenylyl-4')-5-alkylpyrimidines, etc. These compounds contribute to the dielectric anisotropy of the resulting liquid crystal compositions and make the $\Delta\epsilon$ of the compositions a large positive valve.

Among these compounds, many of compounds of the formula (I) wherein m=0 and which are bicyclic, by themselves exhibit no liquid crystalline phase at service temperatures, but their effectiveness upon the $\Delta\epsilon$ of the resulting compositions is large as in the case of liquid crystalline compounds of the formula (I).

Trans-4-alkyl-1-(3-fluoro-4-cyanophenyl)-cyclohexanes and trans-4-alkylcyclohexylyl)-1-(3-fluoro-4-cyanophenyl)-cyclohexanes used as the second component still have a $\Delta\epsilon$ as large as 11 to 25; hence their simultaneous use with the compound of the present invention makes it possible to further reduce the threshold voltage of liquid crystal display elements using the composition of the present invention.

In the composition of the present invention, the content of compounds as the first component expressed by the formula (I) is suitable to be in the range of 10 to 80% by weight. If the content is less than 10% by weight, it is insufficient to improve the aimed reduction in the threshold voltage and its temperature dependency. If the content exceeds 80% by weight, the lower limit temperature of the nematic phase of the resulting liquid crystal composition may rise.

In the composition of the present invention, when compounds of the formula (I) wherein m=0 are used as the first component compounds, the content thereof is suitable to be in the range of 0 to 40% by weight. If the content of bicyclic compounds exhibiting no liquid crystalline phase exceeds 40% by weight, the mesomorphic range of the resulting liquid crystal composition may be narrow.

In the composition of the present invention, compounds of the formula (I) wherein m=1 are suitable to be contained in 10 to 40% by weight as the first component. If the content exceeds 40% by weight, the nematic lower limit temperature of the resulting liquid crystal composition may rise.

In the composition of the present invention, the content of the second component compounds expressed by the formula (IV) is in the range of 10 to 40% by weight. If the content exceeds 40% by weight, rise in the viscosity of the resulting composition becomes notable. If the content is less than 10% by weight, contribution of the resulting composition to $\Delta\epsilon$ value is insufficient.

In the present invention in the second aspect, as compounds used as the third component, it is possible to choose various nematic liquid crystals from among known liquid crystalline compounds within a range in which the object of the present invention is not harmed. Examples of preferred compounds as the third component are those expressed by the above respective formulas (V)–(IX).

The characteristics relative to the respective compound groups expressed by the respective formulas (I)–(IX) and used as a component of the liquid crystal composition of the present invention can be sufficiently described only by way of Examples mentioned later, but the present inventors have achieved by skillfully combining the characteristics of the compounds of the respective groups with the compound of the formula (I) based on knowledge separately obtained.

Namely, the functions of the present invention are illustrated as follows:
(1) The compound of the formula (I) has a large, positive $\Delta\epsilon$ value and the $\Delta\epsilon$ value of the compound of the formula (I) obtained from the $\Delta\epsilon$ value of a mixture of the compound with a liquid crystal of a trans-alkylcyclohexylbenzonitrile by an extrapolation method is as large as 16–28; thus the compound is effective for reducing the threshold voltage to a large extent.
(2) The compound of the formula (I) wherein m=0 and which has two rings has a small viscosity, and the viscosity at 20° C. (hereinafter abbreviated often to $\eta_{20}$) obtained from the $\eta_{20}$ of the above-mentioned mixture by an extrapolation method is in the range of 10 to 20 cp. The compound of the formula (I) wherein m=1 and which has three rings has a $\eta_{20}$ obtained by an extrapolation method, as small as 30 to 40 cp in spite of the compound having three rings. The low viscosity of the compound of the formula (I) contributes to improvement in the response time of liquid crystal display elements using the resulting composition.
(3) The compound of the formula (I) wherein m=0 and which has two rings has an optical anisotropy value (hereinafter abbreviated often to $\Delta n$) obtained from the $\Delta n$ of the above-mentioned mixture by extrapolation method, as small as 0.1 or less; hence the compound contributes to improvement in the view angle characteristic, as well known.

As described above, the present invention has some superior functions and effects. The surprising effects of the present invention consists not only in the above-mentioned reduction in the threshold voltage, improvement in the response properties, etc., but also in improving the temperature dependency of threshold voltage (Vth) while keeping various characteristics required for liquid crystal materials used in liquid crystal display devices of multiplex drive mode, in a well-balanced manner.

As to the value of the temperature dependency of threshold voltage (dV/dt) defined by the equation (1), mentioned later, the nearer the value is to zero, the more desirable it is, in the case of liquid crystal display elements of multiplex drive mode. In the present invention, it has become possible to achieve a further smaller dV/dt value. It is considered that the compound of the formula (I) contributes greatly to this achievement, and it is possible to reduce the dV/dt value within a broad temperature range.

This is illustrated in a comparison of Example 8 with Comparative example 2, mentioned later. Namely, in the case of the nematic liquid crystal compositions of these examples having close clearing points to one another, use of the compound of the formula (I) as a component improves not only the dV/dt value, but also the viscosity and threshold voltage. As a result it may be seen that the response characteristic of liquid crystal display elements has also been notably improved.

Since the nematic liquid crystal composition of the present invention is provided with the above-mentioned characteristics, use of the composition makes possible a multiplex drive at low voltage (e.g. $\frac{1}{2}$–$\frac{1}{3}$ duty at 1.5 V drive).

Conventional materials for liquid crystal display elements used for low voltage drive have been constituted particularly around compounds having a large, positive $\Delta\epsilon$ value among those of metadioxanes, pyrimidines, esters, etc.; thus one could not have helped making effort above all for achieving reduction in the Vth. Nematic liquid crystal materials as representative examples thereof are shown in Comparative example 1 mentioned later. As seen from the Examples and Comparative examples mentioned later, the liquid crystal composition of the present invention shows almost no difference in the Vth in the impressed voltage-brightness characteristic from liquid crystal materials of Comparative examples in spite of their high clearing points, and also the temperature dependency of Vth has been notably improved. Further, the composition of the present invention has a low viscosity and the response time of the liquid crystal display element of the present invention has also been greatly improved as compared with those of Comparative examples.

The present invention will be described in more detail by way of Examples, but it should not be construed to be limited thereto.

In addition, in the present invention, the threshold voltage and the temperature dependency of the threshold voltage are defined as follows:

In the voltage-brightness characteristic, the voltage at which the transmittance of a light in the direction of the optical axis perpendicular to the surface of a display reaches 10% is referred to as threshold voltage and expressed in terms of Vth. Further, when the threshold voltages at two different temperatures $t_1$ (°C.) and $t_2$ (°C.) are referred to as Vth ($t_1$) and Vth ($t_2$), the temperature dependency of the threshold voltages (dV/dt) is determined by the formula (1).

$$\frac{dV}{dt} = \frac{Vth(t_1) - Vth(t_2)}{\frac{Vth(t_1) + Vth(t_2)}{2}} \times \frac{100}{t_1 - t_2} \qquad (1)$$

Further, the response properties of display elements are expressed by rise time ($\tau_r$) and decay time ($\tau_d$) as described below. When a voltage of twice the Vth was impressed, the time which lapsed since the initiation time of the impression till the transmittance of a light reached 90% is referred to as $\tau_r$, and after the transmittance of the light in the voltage-brightness characteristic reached 100% and then a sufficient time lapsed, the time which lapsed since the time when the voltage impression was made of till the time when the transmittance reached 10%, is referred to as $\tau_d$.

In Examples and Comparative examples mentioned below, the compositions are expressed by weight %.

EXAMPLE 1

A nematic liquid crystal composition was prepared, which consisted of the following 4 compounds as those of the formula (I):

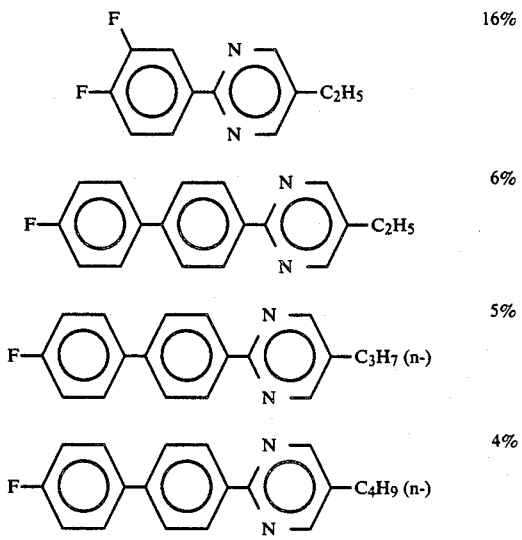

the following 2 compounds are those of formula (IV):

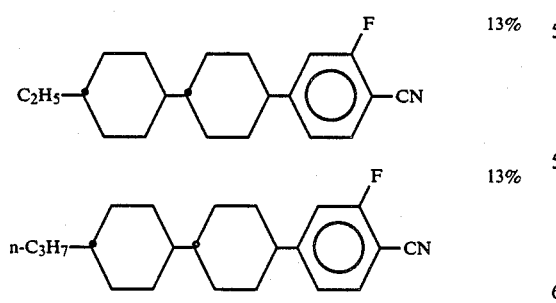

as compounds of the formulas (V), (VI) and (VII),

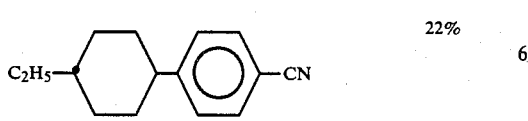

and

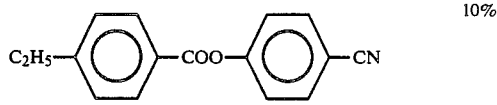

respectively.

The liquid crystal composition has a clearing point of 62.2° C. a $\eta_{20}$ of 39 cP and a $\Delta n$ of 0.154. This liquid crystal composition was filled in a cell subjected to rubbing treatment and having a distance between the substrates, of 8 μm to prepare a homogeneous liquid crystal cell of TN type and its various characteristics were measured. The threshold voltage at 25° C. was 0.98 V and $\tau_r$ and $\tau_d$ at 25° C. were both 50 msec. Further, the value of the temperature dependency of the threshold voltage (dV/dt) was 0.55.

EXAMPLE 2

A nematic liquid crystal composition was prepared, which consisted of the following 2 compounds of the formula (I):

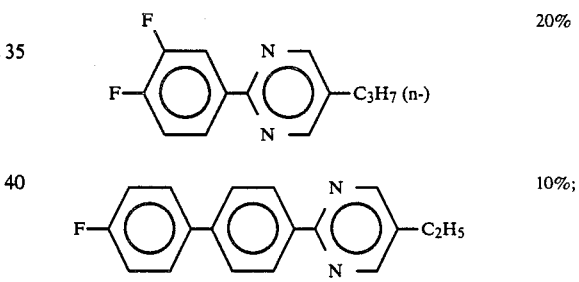

the following 2 compounds of the formula (IV):

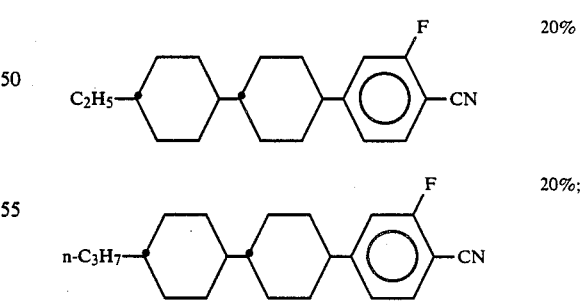

a compound of the formula (V)

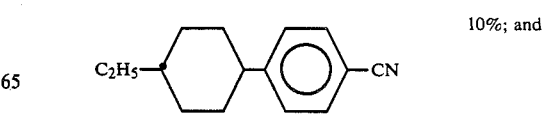

the following 2 compounds of the formula (VI):

[Structure: ethyl-biphenyl-CN] 10%

[Structure: n-C₃H₇-biphenyl-CN] 10%.

The characteristics of the composition are shown in Table 1.

EXAMPLE 3

A nematic liquid crystal composition was prepared, which consisted of the following 4 compounds of the formula (I):

[Structure: 3,4-difluorophenyl-pyrimidine-C₂H₅] 10%

[Structure: F-phenyl-phenyl-pyrimidine-C₂H₅] 10%

[Structure: F-phenyl-phenyl-pyrimidine-C₃H₇(n-)] 10%

[Structure: F-phenyl-phenyl-pyrimidine-C₄H₉(n-)] 10%;

a compound as the second component,

[Structure: C₂H₅-cyclohexyl-cyclohexyl-(3-F-phenyl)-CN] 10%; and the following 4 compounds as the third component:

[Structure: C₂H₅-cyclohexyl-phenyl-CN] 20%

[Structure: n-C₃H₇-cyclohexyl-phenyl-CN] 12%

[Structure: C₂H₅-phenyl-COO-phenyl-CN] 14%

[Structure: n-C₃H₇-phenyl-COO-phenyl-CN] 4%, and its characteristics were measured in the same manner as in Example 1. The results are shown in Table 1.

EXAMPLE 4

A nematic liquid crystal composition consisting of 5 compounds of the formula (I), a compound as the second component and a compound as the third component, each mentioned below was prepared and its various characteristics were measured in the same manner as in Example 1. The results are shown in Table 1.

[Structure: 3,4-difluorophenyl-pyrazine-C₂H₅] 20%

[Structure: 3,4-difluorophenyl-pyrazine-C₃H₇(n-)] 20%

[Structure: F-phenyl-phenyl-pyrimidine-C₂H₅] 15%

[Structure: F-phenyl-phenyl-pyrimidine-C₃H₇(n-)] 15%

[Structure: F-phenyl-phenyl-pyrimidine-C₄H₉(n-)] 10%

[Structure: C₂H₅-cyclohexyl-cyclohexyl-(3-F-phenyl)-CN] 15%

[Structure: C₂H₅-phenyl-phenyl-CN] 5%

EXAMPLE 5

A nematic liquid crystal composition consisting of 3 compounds of the formula (I), 2 compounds of the formula (IV) and 3 compounds as the third component, each mentioned below, was prepared in the same manner as in Example 1, and its various characteristics were measured in the same manner as in Example 1. The results are shown in Table 1.

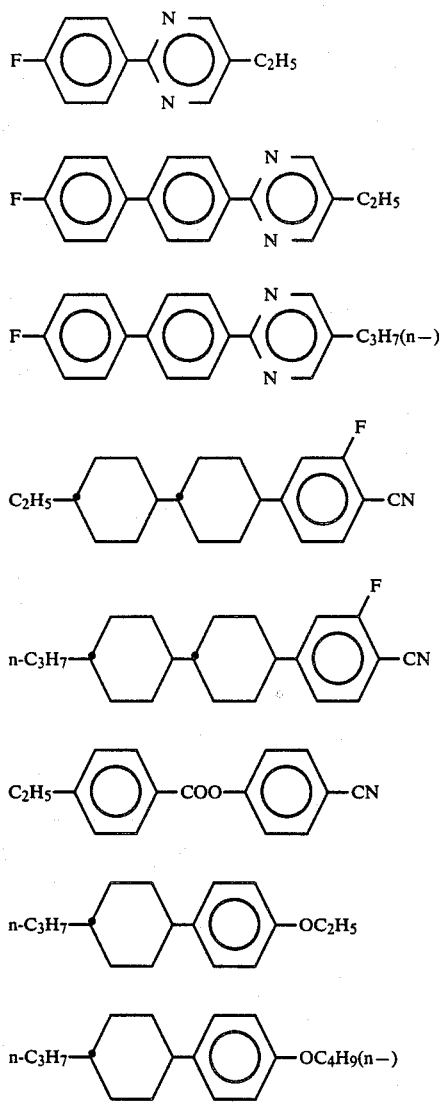

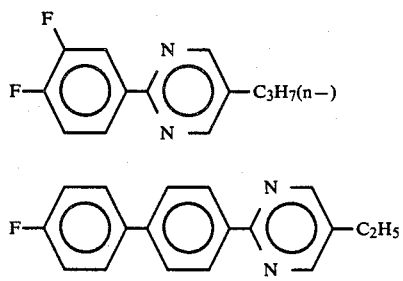

EXAMPLE 6

A nematic liquid crystal composition consisting of 3 compounds of the formula (I), a compound as the second component and 4 compounds as the third component, each mentioned below, was prepared in the same manner as in Example 1, and its various characteristics were measured in the same manner as in Example 1. The results are shown in Table 1.

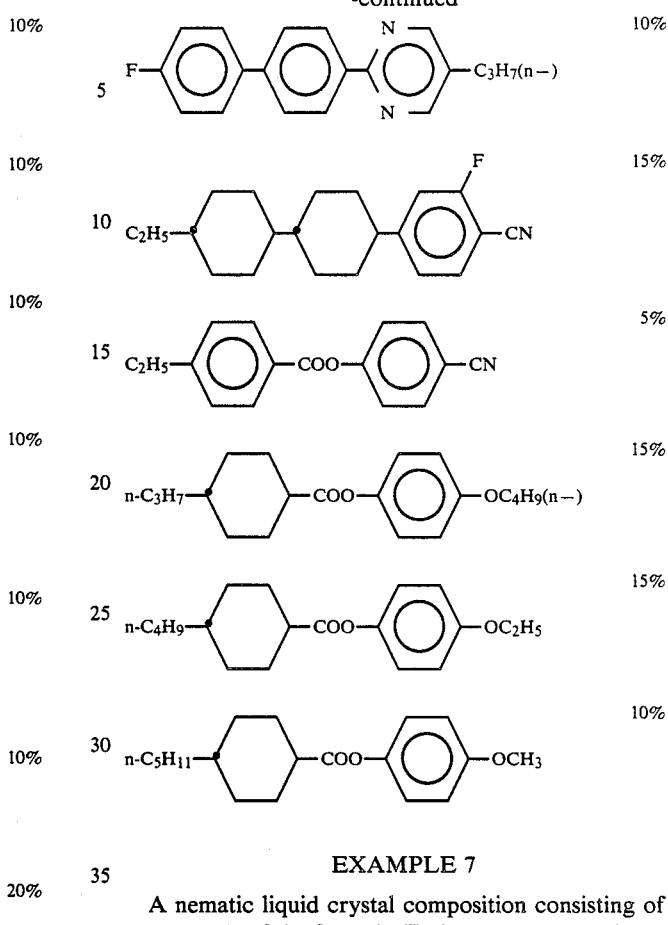

EXAMPLE 7

A nematic liquid crystal composition consisting of 4 compounds of the formula (I), 3 compounds as the second component and 2 compounds as the third component, each mentioned below, was prepared in the same manner as in Example 1, and its various characteristics were measured as in Example 1. The results are shown in Table 1.

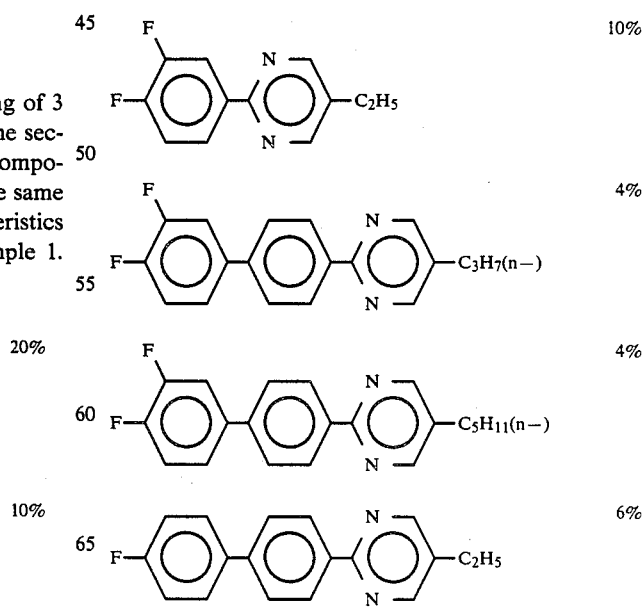

-continued

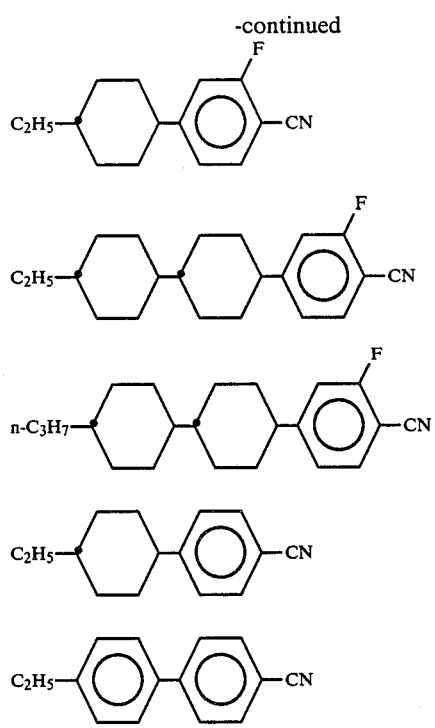

16%

12%

12%

20%

16%

EXAMPLE 8

A nematic liquid crystal composition was prepared in the same manner as in Example 1, which consisted of the following 4 compounds of the formula (I):

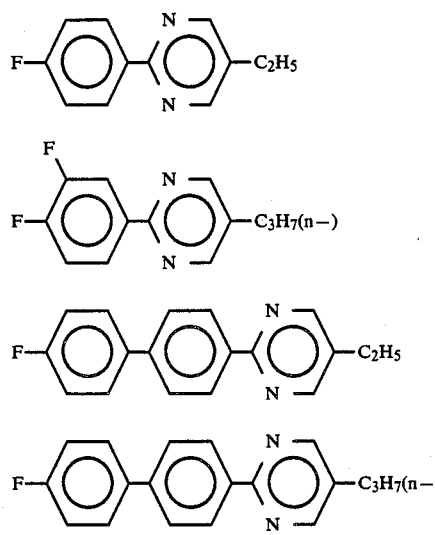

10%

10%

10%

10%;

one compound of the formula (IV) as the second component, 2 compounds of the formula (V) as the third component and one compound of formula (VII) each mentioned below,

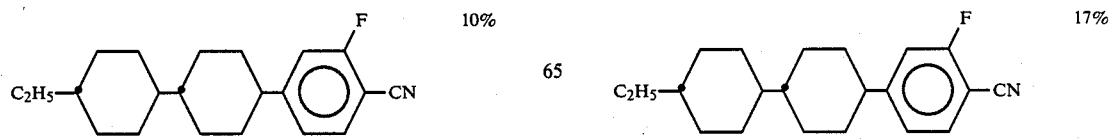

10%

-continued

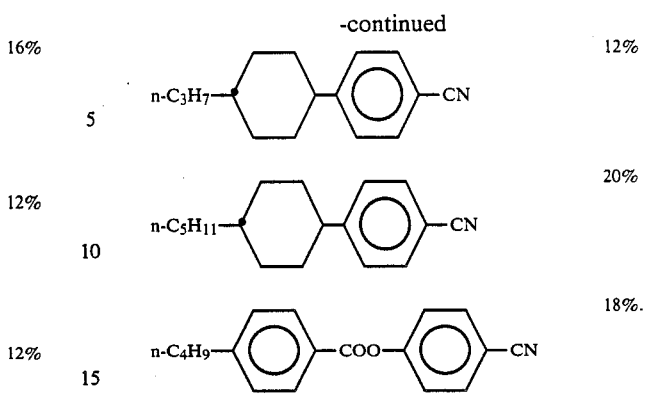

12%

20%

18%.

The various characteristics of the composition are shwon in Table 1.

COMPARATIVE EXAMPLE 1

As a conventional nematic liquid crystal material for low voltage drive, a composition composed of the following components having large $\Delta\epsilon$ was prepared and its various characteristics were measured in the same manner as in Example 1. The results are shown in Table 1 together with those of Examples.

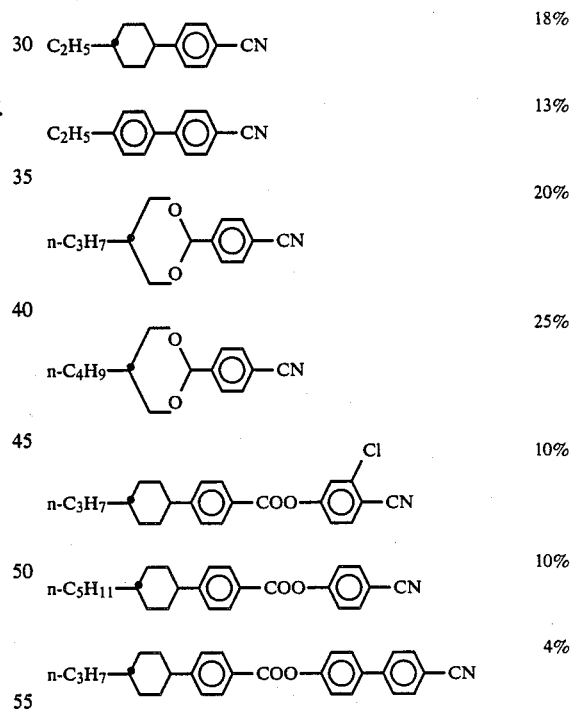

18%

13%

20%

25%

10%

10%

4%

COMPARATIVE EXAMPLE 2

A nematic liquid crystal composition composed only of the following compounds used as the third et seq. components in Example 8 was prepared:

17%

-continued

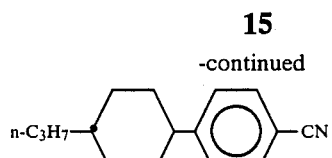 20%

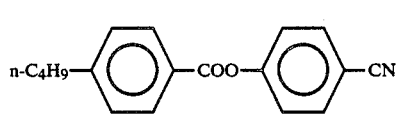 33%

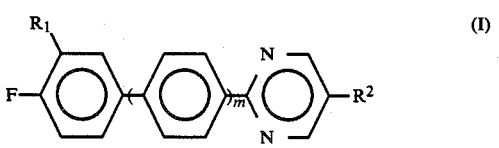 30%

This composition is a blend wherein the compounds of the formula (I) was removed from the composition of Example 8. The characteristics of this nematic liquid crystal composition were measured in the same manner as in Example 8 and the results are shown in Table 1.

TABLE 1

| Characteristic | Example & Comp. ex. | | | | | | | | Comparative example | |
|---|---|---|---|---|---|---|---|---|---|---|
| | Example | | | | | | | | | |
| | 1 | 2 | 3 | 4 | 5 | 6 | 7 | 8 | 1 | 2 |
| Clearing point [°C.] | 62.2 | 73.6 | 67.5 | 64.5 | 72.7 | 67.5 | 59.3 | 54.1 | 62.5 | 55 |
| Optical anisotropy | 0.154 | 0.158 | 0.171 | 0.191 | 0.146 | 0.143 | 0.148 | 0.172 | 0.144 | 0.166 |
| Viscosity (20° C.) [cP] | 39 | 40 | 41 | 32 | 27 | 28 | 39 | 39 | 67 | 46 |
| Vth (25° C.) [V] | 0.98 | 1.08 | 1.06 | 1.05 | 1.31 | 1.28 | 1.03 | 1.00 | 1.10 | 1.20 |
| dV/dt (0~40° C.) [%/°C.] | 0.55 | 0.40 | 0.45 | 0.52 | 0.42 | 0.41 | 0.46 | 0.65 | 0.65 | 0.85 |
| Response time (25° C.) [ms] | | | | | | | | | | |
| Rise ($\tau_r$) | 50 | 80 | 60 | 40 | 40 | 50 | 60 | 80 | 120 | 100 |
| Decay ($\tau_d$) | 50 | 50 | 45 | 45 | 30 | 40 | 50 | 55 | 120 | 70 |

What we claim is:

1. A nematic liquid crystal composition comprising 10 to 80% by weight of a first component comprising at least one compound expressed by the formula

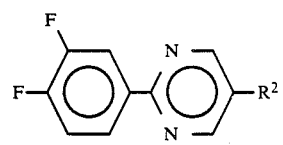 (I)

wherein m represents 0 or 1, $R^1$ represents F or H and $R^2$ represents an alkyl group of 1 to 8 carbon atoms, and 10 to 40% by weight of a second component comprising at least one compound expressed by the formula

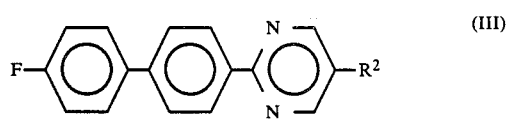 (IV)

wherein l represents 1 or 2 and $R^2$ is as defined above.

2. A nematic liquid crystal composition according to claim 1 wherein said first component expressed by the formula (I) comprises 0 to 40% by weight of a compound expressed by the formula (II)

(II)

and 10 to 40% by weight of a compound expressed by the formula (III)

(III)

said $R^2$ in the formulas (II) and (III) being as defined in claim 1.

3. A nematic liquid crystal composition according to claim 2, consisting of

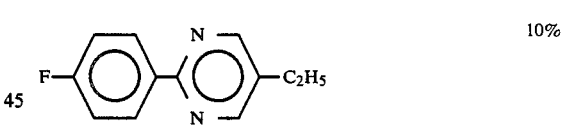 10%

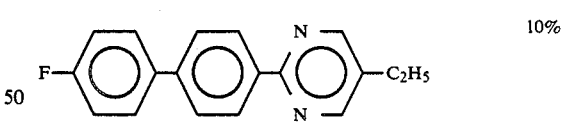 10%

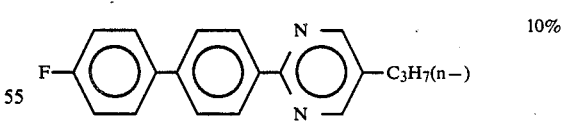 10%

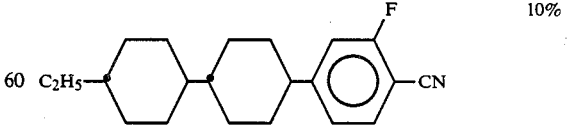 10%

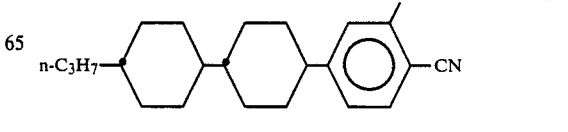 10%

-continued

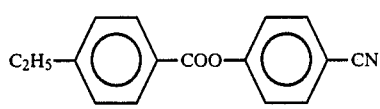 10%

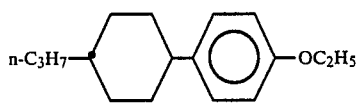 20%

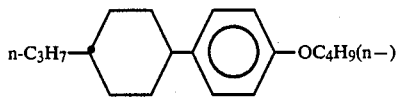 20%.

4. A nematic liquid crystal composition comprising: a first component comprising 0 to 40% by weight of at least one compound expressed by the formula (II) and 10 to 40% by weight of at least one compound expressed by the formula (III), and 10 to 40% by weight of a second component comprising at least one compound expressed by the formula (IV), each mentioned below, and further as third et seq components, 0 to 32% by weight of at least one compound expressed by the formula (V), 0 to 20% by weight of at least one compound expressed by the formula (VI), 0 to 18% by weight of at least one compound expressed by the formula (VII), 0 to 40% by weight of at least one compound expressed by the formula (VIII), and 0 to 40% by weight of at least one compound expressed by the formula (IX), each mentioned below,

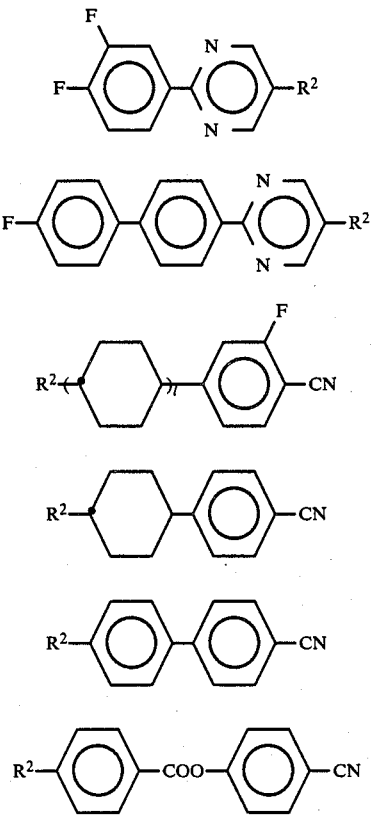

-continued

 (VIII)

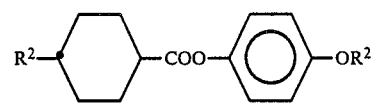 (IX)

wherein $R^2$ represents an alkyl group of 1 to 8 carbon atoms and 1 represents 1 or 2.

5. A nematic liquid crystal composition according to claim 4 consisting of

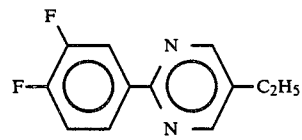 16%

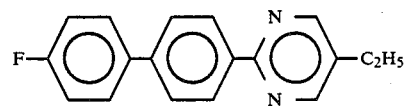 6%

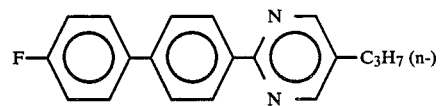 5%

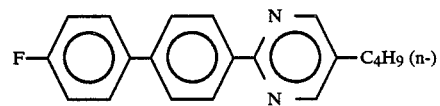 4%

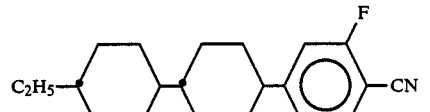 13%

 13%

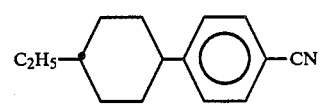 22%

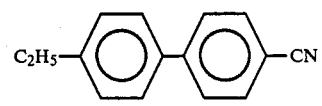 11% and

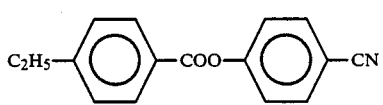 10%.

6. A nematic liquid composition according to claim 4 consisting of

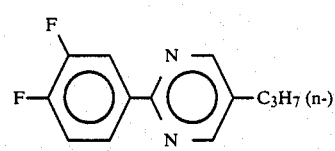 20%
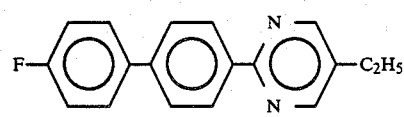 10%
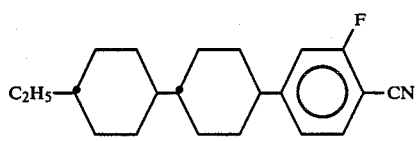 20%
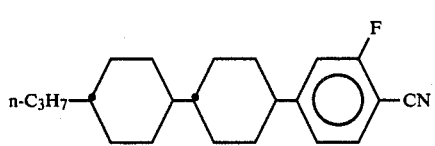 20%
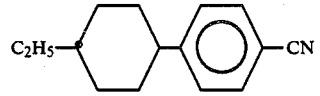 10%
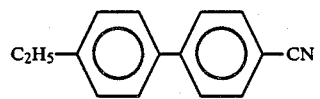 10%,
and
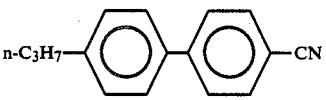 10%.
7. A nematic liquid crystal composition according to claim 4 consisting of
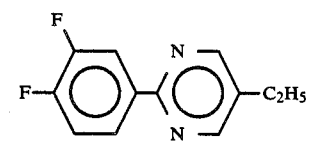 10%
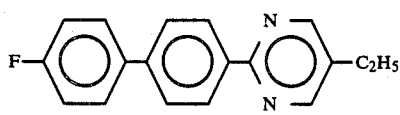 10%
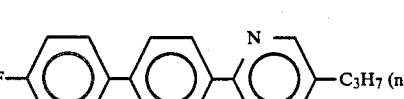 10%
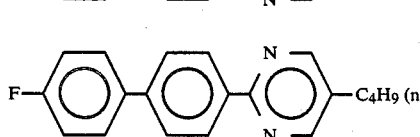 10%
-continued
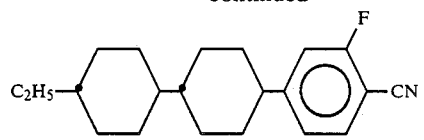 10%
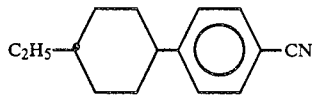 20%
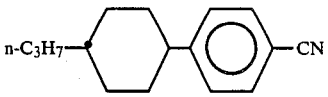 12%
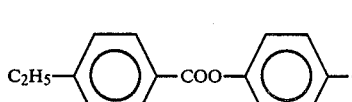 14%
and
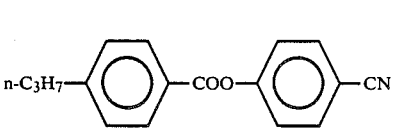 4%.
8. A nematic liquid crystal composition according to claim 4 consisting of
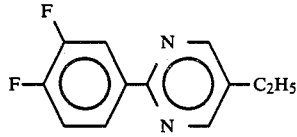 20%
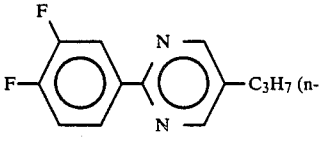 20%
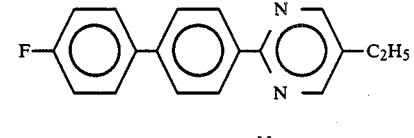 15%
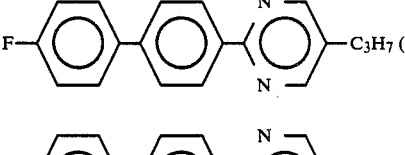 15%
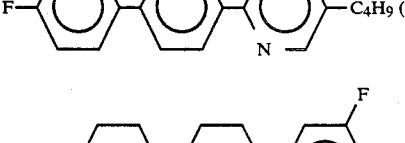 10%
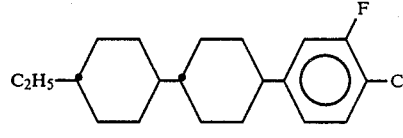 15%
and -continued
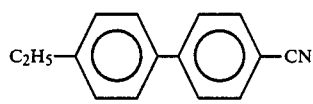 5%.
9. A nematic liquid crystal composition according to claim 4 consisting of
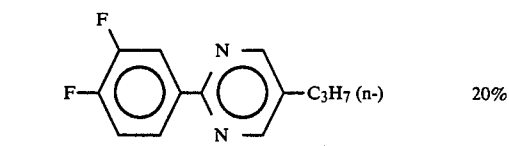 20%
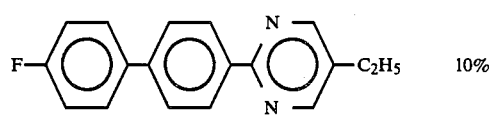 10%
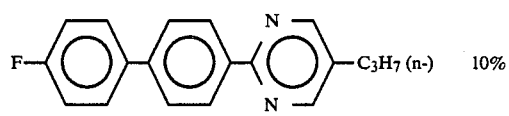 10%
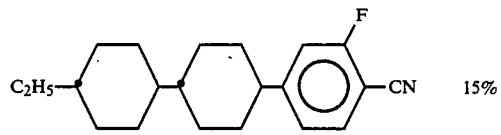 15%
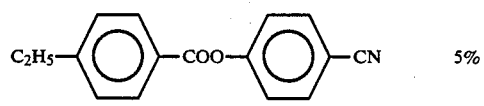 5%
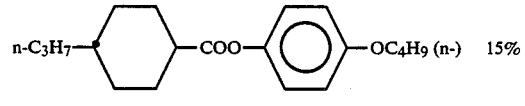 15%
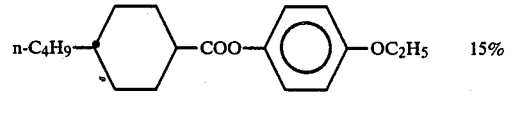 15%
and
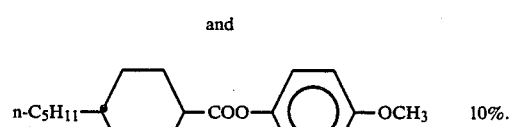 10%.
10. A nematic liquid crystal composition consisting of
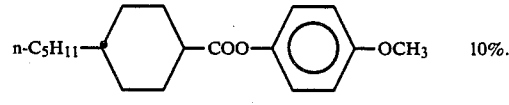 10%
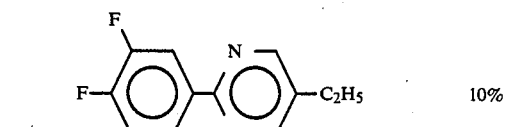 4%
-continued
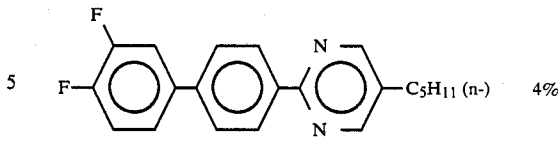 4%
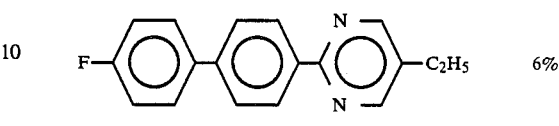 6%
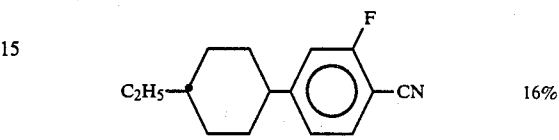 16%
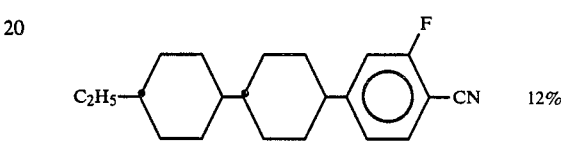 12%
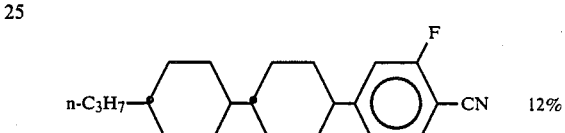 12%
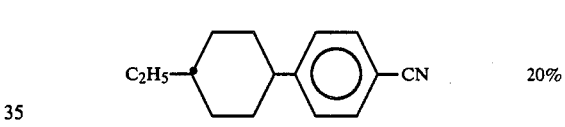 20%
and
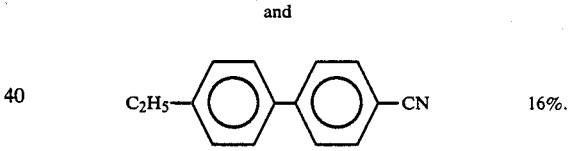 16%.
11. A nematic liquid crystal composition according to claim 4 consisting of
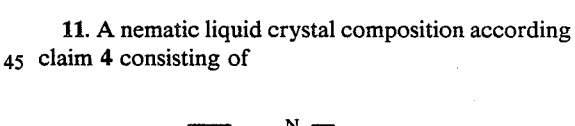 10%
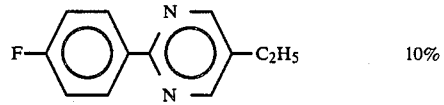 10%
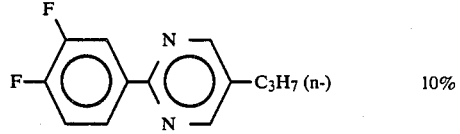 10%
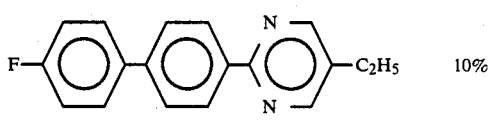 10%

-continued

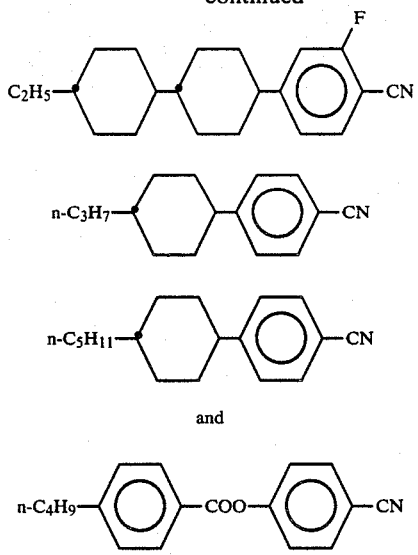

| | |
|---|---|
| C₂H₅—〈H〉—〈H〉—〈Ar-F〉—CN | 10% |
| n-C₃H₇—〈H〉—〈Ar〉—CN | 12% |
| n-C₅H₁₁—〈H〉—〈Ar〉—CN | 20% | and

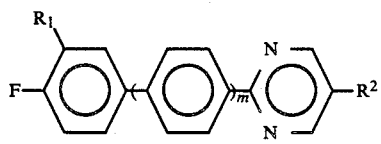

n-C₄H₉—〈Ar〉—COO—〈Ar〉—CN   18%.

12. A liquid crystal display element using a nematic liquid crystal composition comprising a liquid crystal cell containing 10 to 80% by weight of a first component comprising at least one compound expressed by the formula $$\text{F} - \underset{}{\bigcirc} - \underset{}{\bigcirc} \overline{)_m} - \underset{N}{\overset{R_1}{\underset{N}{\bigcirc}}} - R^2 \quad (I)$$

wherein m represents 0 or 1, $R^1$ represents F or H and $R^2$ represents an alkyl group of 1 to 8 carbon atoms, and 10 to 40% by weight of a second component comprising at least one compound expressed by the formula

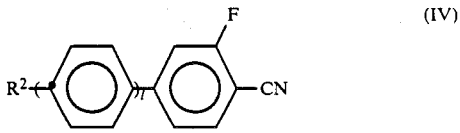

$$R^2 - (\bigcirc)_l - \bigcirc - CN \quad (IV)$$

wherein l represents 1 or 2 and $R^2$ is as defined above.

13. A nematic liquid crystal composition according to claim 1 wherein said first and second components are present in a total amount of at least 50%, by weight, based on the total weight of said composition.

14. A nematic liquid crystal composition according to claim 1 wherein in formula (I), $R^2$ represents an alkyl group having 2 to 5 carbon atoms.

15. A nematic liquid crystal composition according to claim 1 wherein $R^2$ of formula (IV) represents an alkyl group of 2 or 3 carbon atoms.

16. A nematic liquid crystal composition according to claim 2 wherein $R^2$ in formulae (II) and (III) independently represents an alkyl group of 2 to 5 carbon atoms.

17. A nematic liquid crystal composition according to claim 4 wherein $R^2$ in formulae (II), (III), and (V) and (VIII) independently represents an alkyl group of 2 to 5 carbon atoms, $R^2$ in formula (IV) represents an alkyl group of 2 or 3 carbon atoms, and $R^2$ in formula (IX) represents an alkyl group of 1 to 5 carbon atoms.

18. A liquid crystal display element according to claim 12 wherein in formula (I), $R^2$ represents an alkyl group having 2 to 5 carbon atoms.

19. A liquid crystal display element according to claim 12 wherein $R^2$ of formula (IV) represents an alkyl group of 2 or 3 carbon atoms.

* * * * *

UNITED STATES PATENT AND TRADEMARK OFFICE
CERTIFICATE OF CORRECTION

PATENT NO. : 4,776,975

DATED : October 11, 1988

INVENTOR(S) : SAWADA ET AL

It is certified that error appears in the above-identified patent and that said Letters Patent is hereby corrected as shown below:

In the Abstract, in column 2, line 65, column 15, line 60, and column 24, line 5, change Formula (IV) to read as follows:

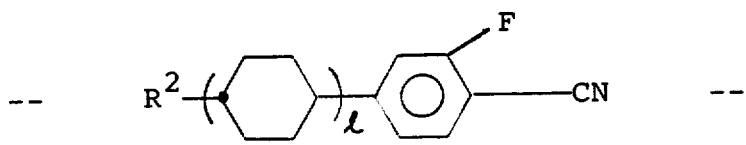

Column 4, line 40, change "valve" to --value--.

Column 4, lines 48 and 49, change "trans-4-alkylcyclohexylyl)-1-(3-fluoro-4-cyanophenyl)-cyclohexanes" to --trans-4-(trans-4-alkylcyclohexylyl)-1-(3-fluoro-4-cyanophenyl)-cyclohexanes--.

Column 24, line 26, change "and" (second occurrence) to --to--.

Signed and Sealed this

Twenty-first Day of November, 1989

Attest:

JEFFREY M. SAMUELS

Attesting Officer      Acting Commissioner of Patents and Trademarks